United States Patent
Eason et al.

(10) Patent No.: US 6,956,750 B1
(45) Date of Patent: Oct. 18, 2005

(54) POWER CONVERTER CONTROLLER HAVING EVENT GENERATOR FOR DETECTION OF EVENTS AND GENERATION OF DIGITAL ERROR

(75) Inventors: Mark D. Eason, Hollister, CA (US); Harry Rodriguez, Gilroy, CA (US); Mark R. Muegge, Cupertino, CA (US)

(73) Assignee: iWatt Inc., Los Gatos, CA (US)

( * ) Notice: Subject to any disclaimer, the term of this patent is extended or adjusted under 35 U.S.C. 154(b) by 25 days.

(21) Appl. No.: 10/735,211

(22) Filed: Dec. 12, 2003

Related U.S. Application Data

(60) Provisional application No. 60/471,220, filed on May 16, 2003.

(51) Int. Cl.[7] ............................................. H02M 3/335
(52) U.S. Cl. .................................................. 363/21.01
(58) Field of Search ............................... 363/20, 21.01, 363/21.12, 21.18

(56) References Cited

U.S. PATENT DOCUMENTS

| | | | |
|---|---|---|---|
| 3,769,568 A | * 10/1973 | Hamilton et al. | ............. 363/25 |
| 4,521,672 A | * 6/1985 | Fronius | ................. 219/130.33 |
| 4,823,070 A | 4/1989 | Nelson | |
| 5,134,255 A | 7/1992 | Tetrault et al. | |
| 5,134,355 A | 7/1992 | Hastings | |
| 5,138,543 A | 8/1992 | Harm et al. | |
| 5,305,192 A | 4/1994 | Bonte et al. | |
| 5,325,282 A | 6/1994 | Bansard | |
| 5,438,499 A | 8/1995 | Bonte et al. | |
| 5,638,265 A | 6/1997 | Gabor | |
| 5,751,561 A | 5/1998 | Ho et al. | |
| 5,757,626 A | 5/1998 | Jovanovic et al. | |
| 5,841,643 A | 11/1998 | Schenkel | |
| 5,991,172 A | 11/1999 | Jovanovic et al. | |
| 6,038,146 A | 3/2000 | Luo et al. | |
| 6,043,633 A | 3/2000 | Lev et al. | |
| 6,215,288 B1 | 4/2001 | Ramsey et al. | |
| 6,275,018 B1 | 8/2001 | Telefus et al. | |
| 6,304,473 B1 | 10/2001 | Telefus et al. | |
| 6,324,079 B1 | 11/2001 | Collmeyer et al. | |
| 6,370,039 B1 | 4/2002 | Telefus | |
| 6,381,150 B2 | 4/2002 | Telefus | |
| 6,385,059 B1 | 5/2002 | Telefus et al. | |
| 6,396,722 B2 | * 5/2002 | Lin | .............................. 363/98 |
| 6,404,173 B1 | 6/2002 | Telefus | |
| 6,434,021 B1 | 8/2002 | Collmeyer et al. | |
| 6,621,255 B2 | 9/2003 | Telefus | |

OTHER PUBLICATIONS

Bibian, Stephane et al., "Digital Control with Improved Performance for Boost Power Factor Correction Circuits," 16th Annual IEEE Applied Power Electronics Conference and Exposition, Mar. 2001, vol. 1, pp. 137–143.

Erickson, Robert et al., "Design of a Simple High–Power–Factor Rectifier Based on the Flyback Converter," Proceedings of IEEE Applied Power Electronics Conference 1990, Mar. 1990, pp. 792–801.

(Continued)

Primary Examiner—Adolf Berhane
(74) Attorney, Agent, or Firm—Fenwick & West LLP

(57) ABSTRACT

A power converter comprises an event detection module detecting various events of the power converter in real time at the switching frequency of a switch in the power converter according to predetermined criteria. A pulse generator generates control signals for controlling the on-times and off-times of the switch based on the various detected events. The events detected by the event detection module include a detection of a "knee" in the reflected secondary voltage on the auxiliary windings of the transformer in a primary side sensing flyback power converter, and detection of a digital error quantifying the difference between the reference voltage and the reflected secondary voltage on the auxiliary windings of the transformer in time domain.

32 Claims, 10 Drawing Sheets

OTHER PUBLICATIONS

Murphy, P. et al., "Digital Control of Power Factor Correction," Power Electronics–Annual Seminar, 2003, pp. 341–347.

Zhang, Wanfeng et al., "A New Predictive Control Strategy for Power Factor Correction," 18$^{th}$ Annual IEEE Applied Power Electronics Conference and Exposition, Feb. 2003, vol. 1, pp. 403–409.

"NCP1651—Product Review, Single Stage Power Factor Control," Apr. 2002, Rev. 1, Semiconductor Components Industries, LLC.

"NCP1651—Single Stage Power Factor Control" [online], Oct. 2003, Rev. 5, ON Semiconductor Components Industries LLC, [retrieved Jan. 26, 2004]. Retrieved from Internet: <URL: http://www.onsemiconductor.com/pub/Collateral/NCP1651-D.pdf>.

"AND8124/D—90W, Universal Input, Single Stage, PFC Converter" [online], Dec. 2003, ON Semiconductor Components Industries LLC, [retrieved Jan. 26, 2004]. Retrieved from Internet: <URL: http://www.onsemiconductor.com/pub/Collateral/AND8124-D.pdf>.

"Unitrode UC1854, UC2854, UC3854 High Power Factor Preregulator," Jun. 1998, Texas Instruments Incorporated.

"Linear Technology LT1103/LT1105 Offline Switching Regulator" [online], retrieved on Apr. 12, 2004. Retrieved from Internet: <URL: http://www.linear.com/pdf/11035fd.pdf>.

"Linear Technology LT1725 General Purpose Isolated Flyback Controller" [online], retrieved on Apr. 12, 2004. Retrieved from Internet: <URL: http://www.linear.com/pdf/1725fd.pdf>.

"Linear Technology LT1103/LT1105 Offline Switching Regulator" [online], retrieved on Apr. 12, 2004. Retrieved from Internet: <URL:http://www.linear.com/pdf/11035fd-.pdf>.

"Linear Technology LT1725 General Purpose Isolated Flyback Controller" [online], retrieved on Apr. 12, 2004. Retrieved from Internet: <URL:http://www.linear.com/pdf/1725pdf>.

* cited by examiner $V_{SENSE}$ is measured at a point near the end of the OFF period. This voltage is compared to the $V_{SENSE}$ threshold. If it is higher, the next cycle is a sense cycle. Otherwise, the next cycle is a power cycle.

US 6,956,750 B1

POWER CONVERTER CONTROLLER HAVING EVENT GENERATOR FOR DETECTION OF EVENTS AND GENERATION OF DIGITAL ERROR

CROSS-REFERENCE TO RELATED APPLICATIONS

This application claims priority under 35 U.S.C. §119(e) to co-pending U.S. Provisional Patent Application No. 60/471,220 entitled "Power Converter Controller Having Event Generator For Detection of Events and Generation of Digital Error," filed on May 16, 2003, the subject matter of which is incorporated by reference herein in its entirety, and this application is also related to U.S. Pat. No. 6,385,059 issued on May 7, 2002 to Telefus et al., entitled "Transformer-Coupled Switching Power Converter Having Primary Feedback Control," to U.S. Pat. No. 6,304,473 issued on Oct. 16, 2001 to Telefus et al., entitled "Operating a Power Converter at Optimal Efficiency," and to U.S. Pat. No. 6,275,018 issued on Aug. 14, 2001 to Telefus et al., entitled "Switching Power Converter with Gated Oscillator Controller."

TECHNICAL FIELD

The present invention relates generally to a power converter, and more specifically, to a power converter controller having an event generator for detection of events and generation of a digital error.

BACKGROUND OF THE INVENTION

Power converters typically require error circuitry that provides an "error" signal between the output voltage of the power converter and a reference voltage, in order to regulate the output voltage to a value compatible with the power converter. The error circuitry should provide a magnitude and a sign (positive or negative) of the output voltage, so that the power converter can use such error signal to properly regulate the output voltage against the reference voltage by increasing or decreasing the amount of power delivered to the output of the power converter in response to such error signal.

Conventional power converters typically generate an error signal by sensing the output voltage as an analog value, deriving the difference between the sensed output voltage and the reference voltage as an analog value and amplifying it. Conventional power converters may also use an analog-to-digital converter (A/D converter) for the error signal depending upon the control scheme. Other conventional power converters may use analog error amplifiers to generate the error signal. Conventional power converters cannot generate the error signals in real time at the operating frequency of the power converter, although real time detection of certain events in the power converters and real time generation of error signals would significantly improve the performance of power converters.

Therefore, there is a need for a power converter that does not require an A/D converter or analog error amplifier in generating a digital error signal. There is also a need for a power converter that can generate digital error signals in real time at the switching frequency of the switch in the power converter. There is also a need for a power converter that does not require external circuitry for generation of the digital error signals.

SUMMARY OF INVENTION

The present invention provides a power converter that can detect events occurring in the power converter in real time at the switching frequency of the switch in the power converter. The power converter includes a switch controller that controls the on-times and off-times of a switch in the power converter using the detected events. The switch controller includes an event detection module detecting various events of the power converter according to predetermined criteria in real time at the switching frequency of the switch in the power converter, and a pulse train generator generating control signals for controlling the on-times and off-times of the switch in the power converter based on the various detected events.

The event detection module detects a number of events that are used by the pulse train generator. Those events include a detection of a "knee" in the reflected secondary voltage $V_{SENSE}$ on the auxiliary winding of a transformer in a primary-side sensing flyback power converter, and detection of a digital error quantifying the difference between the reference voltage and the reflected secondary voltage on the auxiliary winding of the transformer in time domain.

A "knee" in the present invention is defined as the value of the reflected secondary voltage on the auxiliary windings of a transformer in a primary-side sensing flyback power converter when the current in the secondary (output) winding of the transformer in the power converter falls to substantially zero. A knee can be detected by comparing the reflected secondary voltage on the auxiliary winding of a transformer to a predetermined knee voltage using a knee comparator.

The power converter first determines a gap, defined as the time difference between the point on the waveform of the reflected secondary voltage at which such reflected voltage equals the knee voltage and the point at which such reflected voltage equals the reference voltage ($V_{REG}$). Once the gap is determined, the power converter determines the digital error by subtracting such gap from a sample time offset. The sample time offset is a predetermined value corresponding to a time difference between the desired sampling point of the reflected voltage and the point at which such reflected voltage equals the knee voltage.

If the digital error is a positive value, the power converter in the next switching cycle reduces the amount of power delivered to the output load by controlling the switch. If the digital error is a negative value, the power converter in the next switching cycle increases the amount of power delivered to the output load by controlling the switch. Therefore, the power converter of the present invention immediately adjusts the output voltage in real time in response to the real time detection of various events such as the digital error.

The power converter of the present invention is capable of detecting various events, including detection of a "knee" and generation of digital error signals, in real time in each switching cycle, without the need for costly analog-to-digital converters. The various events are detected in time domain in terms of a time value, so that the switch controller in the power converter can immediately use such detected event information in controlling the on-times and off-times of the switch.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1A:
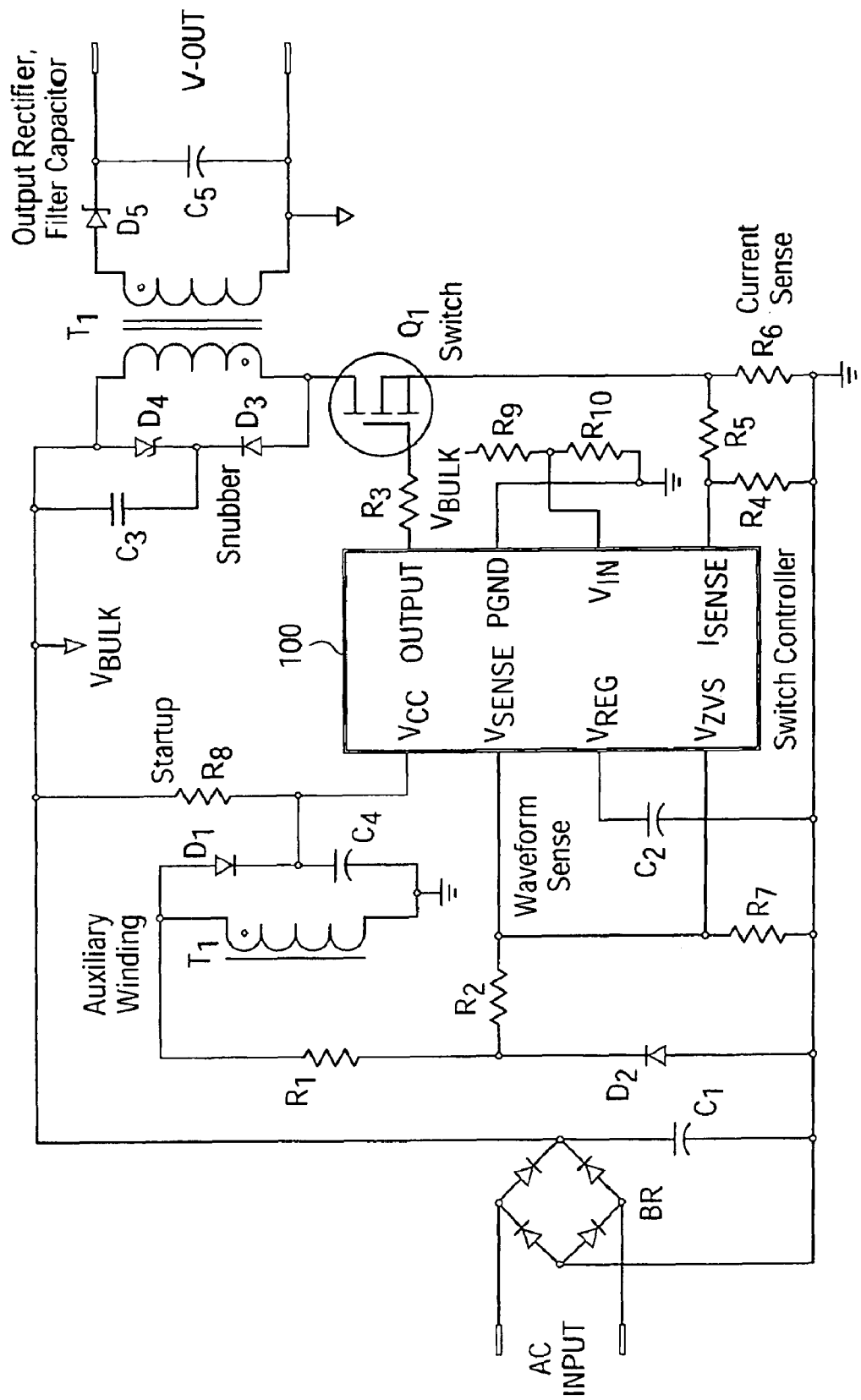
FIG. 1A is diagram illustrating a power converter according to one embodiment of the present invention.

The embodiments of the present invention will be described below with reference to the accompanying drawings. Like reference numerals are used for like elements in the accompanying drawings.

FIG. 1A is diagram illustrating a power converter according to one embodiment of the present invention. The power converter of FIG. 1 is a flyback converter with primary side sensing of the feedback signals. However, it should be noted that the present invention is not limited to a flyback converter and that it can be applied to a power converter of any topology. The power converter includes, among other components, a bridge rectifier BR, a transformer $T_1$, a switch $Q_1$, an output rectifier diode $D_5$, output filter capacitor $C_5$, and a switch controller 100.

Referring to FIG. 1A, the rectifier BR receives an input AC voltage and converts it into a full-wave rectified voltage for transfer to the output V-OUT. The switch controller 100 controls the opening and closing of the switch $Q_1$ using its output control signal OUTPUT. When the switch $Q_1$ is turned on, energy is stored in the primary side windings of the transformer $T_1$ because the diode $D_5$ is reverse biased. When the switch $Q_1$ is turned off, the energy stored in the primary windings of the transformer $T_1$ is released to the secondary side of the transformer $T_1$ because the diode $D_5$ becomes forward biased. By controlling the period of time during which the switch $Q_1$ is on or off, the power converter can control the amount of power delivered to the output.

The switch controller 100 receives various input parameters for use in controlling the switch $Q_1$. The switch controller 100 receives a Vcc (supply voltage) via the startup resistor $R_8$, a divided-down version ($V_{SENSE}$) of the reflected secondary voltage on the auxiliary windings of the transformer $T_1$, a reference voltage $V_{REG}$ of the switch controller 100, a zero voltage switching voltage $V_{ZVS}$, an input voltage $V_{IN}$ which is a scaled version of $V_{BULK}$, the primary current sense voltage $I_{SENSE}$ sensing the current flowing through switch $Q_1$ in terms of a voltage across the network of resistors $R_4$, $R_5$, and $R_6$, and Power Ground (PGND), and generates a control signal OUTPUT coupled to the switch $Q_1$ for controlling the on-times and off-times of the switch $Q_1$. The diode $D_5$ rectifies the output voltage on the secondary windings of the transformer $T_1$ and the capacitor $C_5$ filters the output voltage signal on the secondary windings of the transformer $T_1$ for outputting as V-OUT.

Figure 1B:
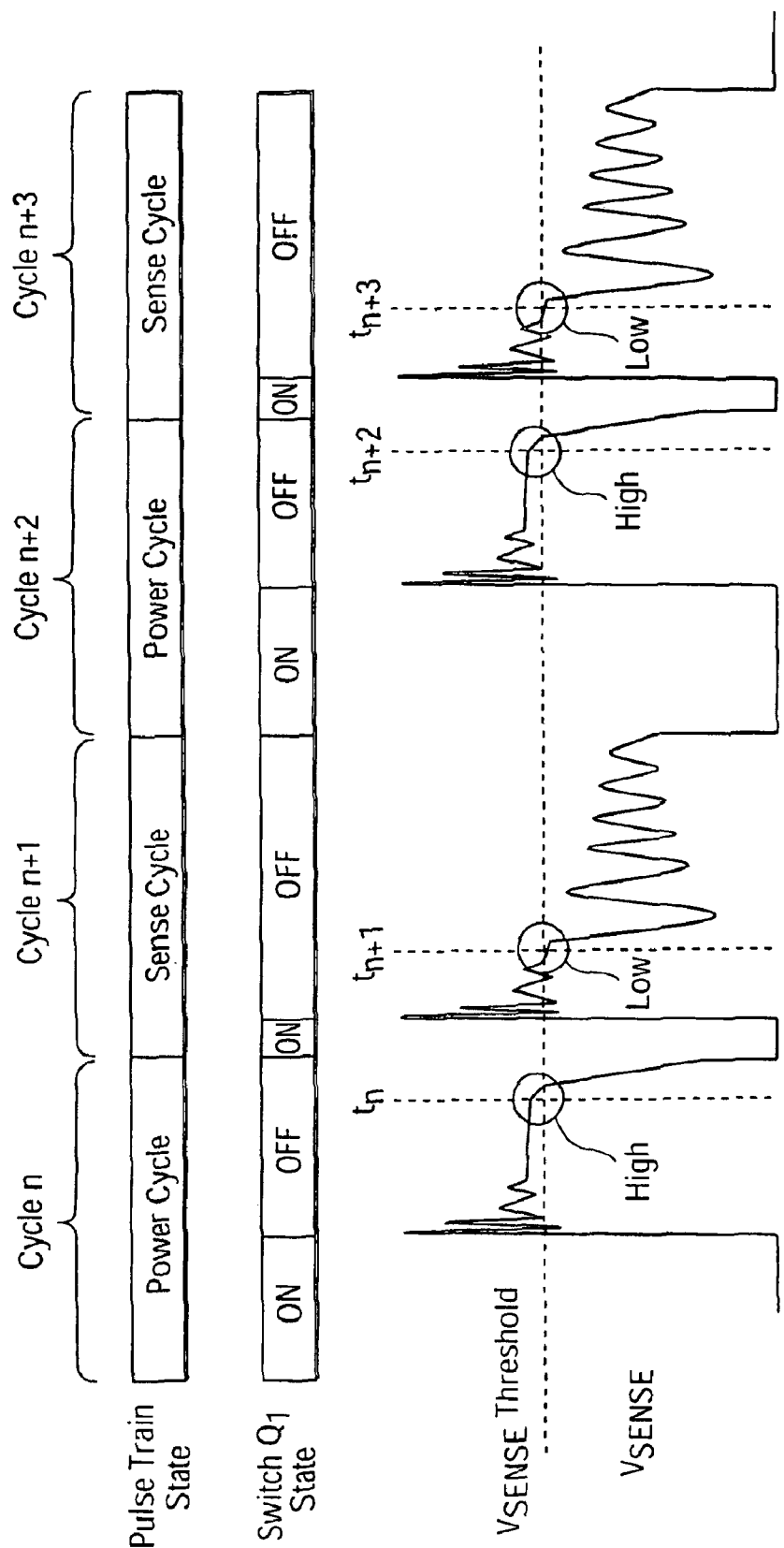
FIG. 1B is a diagram illustrating the cycles in which the switch in the power converter is controlled by the switch controller and the waveforms of the signal $V_{SENSE}$ during such switching cycles, according to one embodiment of the present invention.

FIG. 1B is a diagram illustrating the cycles in which the switch $Q_1$ is controlled by the switch controller 100 and the waveforms of the signal $V_{SENSE}$ during such cycles, according to one embodiment of the present invention. Referring to FIG. 1B, the switch $Q_1$ is sometimes turned on primarily for the purpose of delivering energy to the load (power cycle), although primary side sensing is still carried out during the power cycle. During the power cycle, the power converter is typically operated in critical discontinuous conduction mode to deliver as much power to the load as possible. At other times, the switch $Q_1$ is turned on primarily for the purpose of primary-side sensing of the output voltage (sense cycle), although some power is still delivered to the load during the sense cycle. During the sense cycle, the power converter is typically operated in discontinuous conduction mode to deliver less power to the load. In one embodiment, the switch controller 100 generates control signals OUT to control the switch $Q_1$ according to the power cycles and sense cycles depicted in FIG. 1B.

As shown in FIG. 1B, $V_{SENSE}$ is sampled at points ($t_n$, $t_{n+1}$, $t_{n+2}$, $t_{n+3}$) near the end of the OFF period of each power cycle or sense cycle and is compared to the threshold voltage $V_{SENSE-THRESHOLD}$. If the sampled value of $V_{SENSE}$ is larger than $V_{SENSE}$ THRESHOLD, the next cycle is controlled by the switch controller 100 to be a sense cycle. If the sampled value of $V_{SENSE}$ is smaller than $V_{SENSE-THRESHOLD}$, the next cycle is controlled by the switch controller 100 to be a power cycle.

Figure 2A:
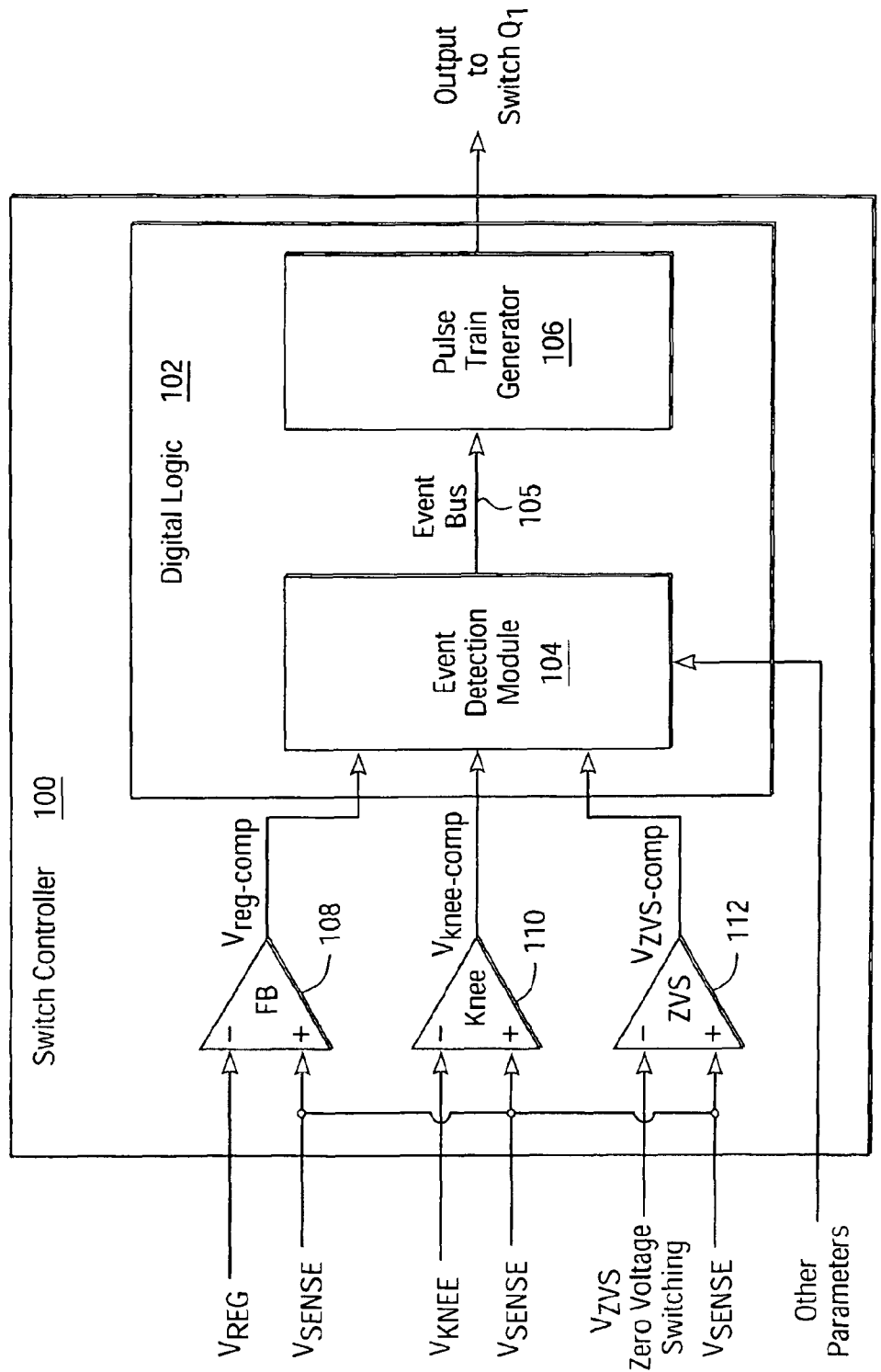
FIG. 2A is a block diagram illustrating the switch controller according to one embodiment of the present invention.

FIG. 2A is a block diagram illustrating the switch controller 100 according to one embodiment of the present invention. The switch controller 100 receives various power converter parameters, such as the reference voltage $V_{REG}$, auxiliary winding voltage $V_{SENSE}$, knee voltage $V_{KNEE}$, zero voltage switching voltage $V_{ZVS}$, etc. and generates an output signal for controlling the on-times and off-times of the switch $Q_1$.

The switch controller 100 includes a feedback (FB) comparator 108, a knee comparator 110, a Zvs (zero voltage switching) comparator 112, and digital logic 102. The digital logic 102 includes an event detection module 104 and a pulse train generator 106. The digital logic 102 may be implemented in any form of digital circuitry, including digital logic gates or microprocessors with software embedded therein.

The feedback (FB) comparator 108 receives the auxiliary winding voltage $V_{SENSE}$ and the reference voltage $V_{REG}$ against which the auxiliary winding voltage $V_{SENSE}$ is regulated, and generates an output signal $V_{reg-comp}$ that is high when the auxiliary winding voltage $V_{SENSE}$ is higher than the reference voltage $V_{REG}$ and low when the auxiliary winding voltage $V_{SENSE}$ is lower than the reference voltage $V_{REG}$. The reference voltage $V_{REG}$ is a reference voltage used by the switch controller 100 to regulate the auxiliary winding voltage $V_{SENSE}$ to a level that is compatible with the switch controller 100. In one embodiment, the reference voltage $V_{REG}$ is 2 volts. $V_{REG}$ can be internally generated in the switch controller 100 or can be provided by external circuitry.

The knee comparator 110 receives the auxiliary winding voltage $V_{SENSE}$ and a knee voltage $V_{KNEE}$ against which the auxiliary winding voltage $V_{SENSE}$ is compared, and generates an output signal $V_{knee-comp}$ that is high when the auxiliary winding voltage $V_{SENSE}$ is higher than the knee voltage $V_{KNEE}$ and low when the auxiliary winding voltage $V_{SENSE}$ is lower than the knee voltage $V_{KNEE}$. The knee voltage $V_{KNEE}$ is defined as the value of the auxiliary winding voltage $V_{SENSE}$ when the output current of the power converter flowing through the secondary winding of the transformer T1 (i.e., through diode D5) in FIG. 1A is substantially zero in each switching cycle. The knee voltage $V_{KNEE}$ can be internally generated in the switch controller 100 or can be provided by external circuitry. The knee voltage $V_{KNEE}$ and its significance and use will be explained in more detail below with reference to FIG. 4 and FIGS. 5A–5B.

The Zvs comparator 112 receives the auxiliary winding voltage $V_{SENSE}$ and the zero voltage switching reference voltage $V_{ZVS}$ against which the auxiliary winding voltage $V_{SENSE}$ is compared, and generates an output signal $V_{zvs-comp}$ that is high when the auxiliary winding voltage $V_{SENSE}$ is higher than the zero voltage switching reference voltage $V_{ZVS}$ and low when the auxiliary winding voltage $V_{SENSE}$ is lower than the zero voltage switching reference voltage $V_{ZVS}$. The zero voltage switching reference voltage $V_{ZVS}$ is zero or a value slightly higher than zero in order to ensure zero voltage switching of the power converter. The zero voltage reference voltage $V_{ZVS}$ can be internally generated in the switch controller 100 or can be provided by external circuitry. The zero voltage reference voltage $V_{ZVS}$ and its significance and use will be explained in more detail below with reference to FIG. 4 and FIGS. 5A–5B.

The event detection module 104 receives the output signals $V_{reg-comp}$, $V_{knee-comp}$, and $V_{ZVS-comp}$ from the feedback comparator 108, knee comparator 110, and Zvs comparator 112, respectively, and also receives other various power converter parameters. The event detection module 104 detects events occurring in the power converter using the received power converter parameters.

The event detection module 104 provides such event detection information to the pulse train generator 106 via the event bus 105. In one embodiment, the event detection module provides such event detection information in terms of a digital flag signal provided to the pulse train generator 106 via the event bus 105. In one embodiment, the event detection information is reset at the beginning of every cycle of $V_{SENSE}$. In another embodiment, the event detection information is not reset because the events are not pulse events that occur in each switching cycle but rather one-time events.

The pulse train generator 106 receives the event detection information from the event detection module 104 via the event bus 105, and uses such information to generate proper output pulses OUT for controlling the on-times and off-times of the switch $Q_1$ in accordance with the detected events.

Figure 2B:
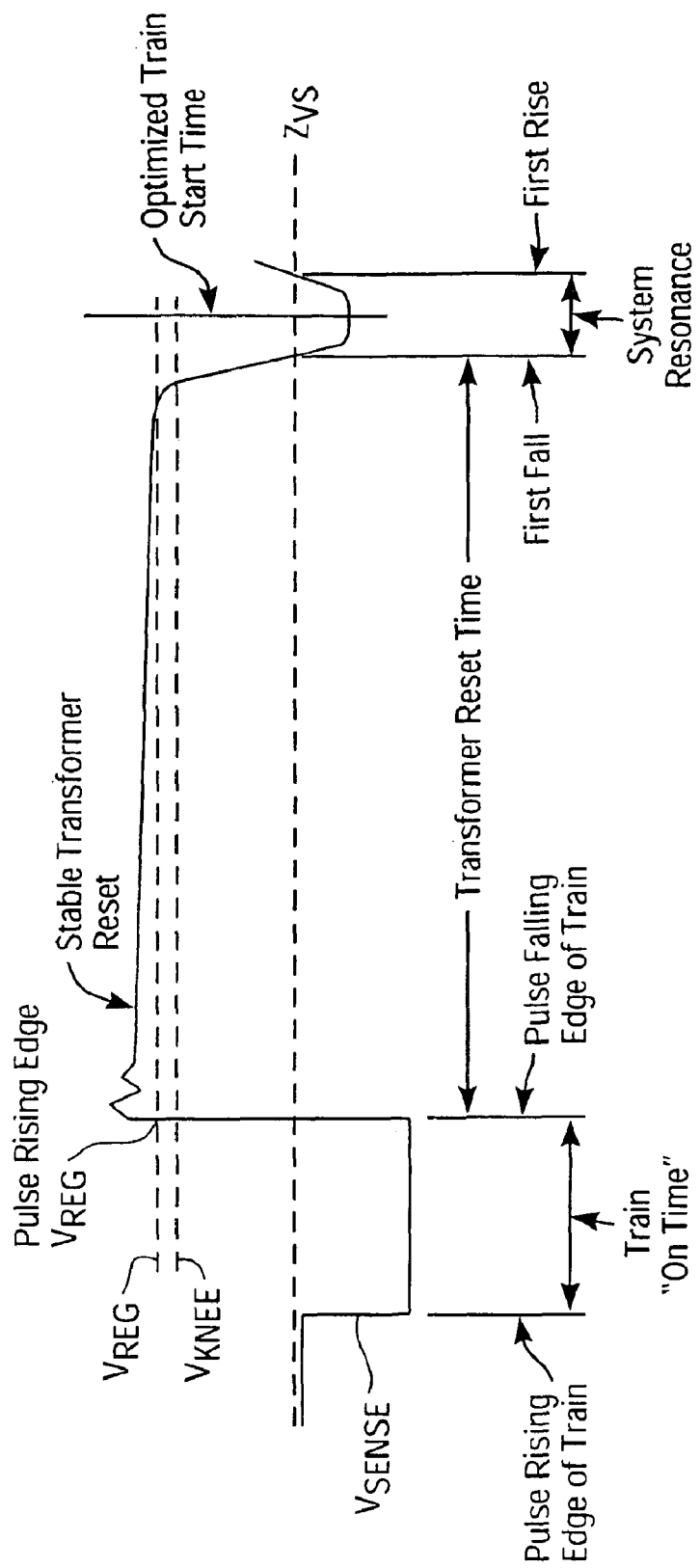
FIG. 2B is a diagram illustrating a typical waveform of the reflected secondary voltage $V_{SENSE}$ on the auxiliary winding of the transformer in the power converter according to one embodiment of the present invention

FIG. 2B is a diagram illustrating a typical signal waveform of the pulse of the auxiliary winding voltage $V_{SENSE}$. Referring to FIG. 2B, the events detected by the event detection module 104 include, for example, (i) the value of the auxiliary winding voltage $V_{SENSE}$ falling lower than the reference voltage $V_{REG}$ (pulse falling edge $V_{REG}$), (ii) the auxiliary winding voltage $V_{SENSE}$ falling lower than the knee voltage $V_{KNEE}$, (iii) the auxiliary winding voltage $V_{SENSE}$ falling lower than the zero voltage reference voltage Zvs, and the like. Other events detected include (iv) the pulse rising edge of the train "on" time, (v) the pulse falling edge of the train "on" time, (vi) the pulse first fall (point where $V_{SENSE}$ equals Zvs when it is falling), (vii) the pulse first rise (point where $V_{SENSE}$ equals Zvs when it is rising), (viii) system resonance (different in time between the points of pulse first rise and pulse first fall), (ix) pulse stable transformer reset time, (x) pulse rising edge $V_{REG}$, (point where $V_{SENSE}$ equals $V_{REG}$ when it is rising), and the like. It should be noted that the events detected are not limited to those described herein and that any power converter parameter that may be useful for control of the power converter may be detected by the event detection module 104 by adding the proper circuitry for detecting such events.

Figure 3A:
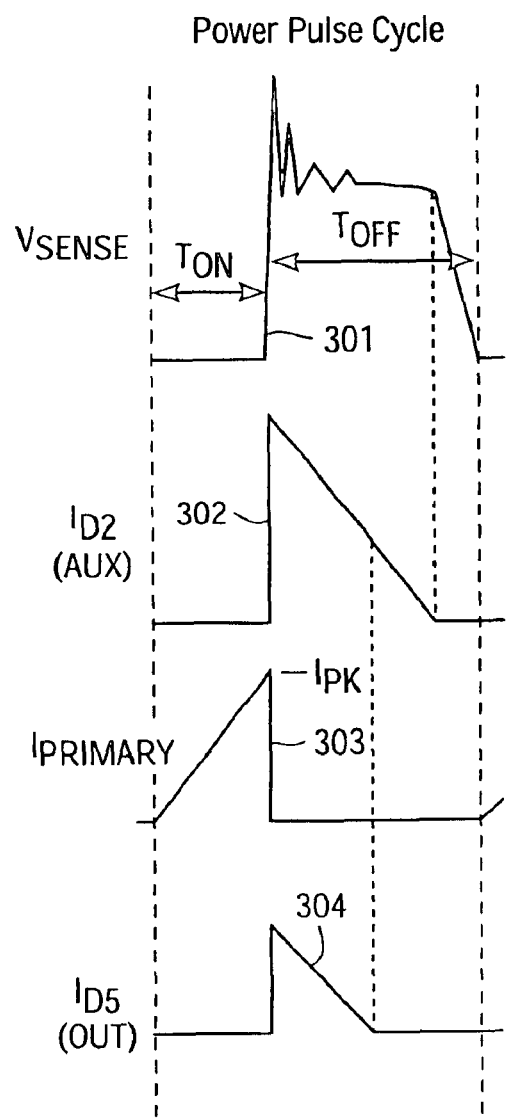
FIGS. 3A and 3B are diagrams showing the waveforms of $V_{SENSE}$, $I_{D2}$, $I_{PRIMARY}$, and IDS for a power pulse cycle and a sense pulse cycle, respectively.
Figure 3B:
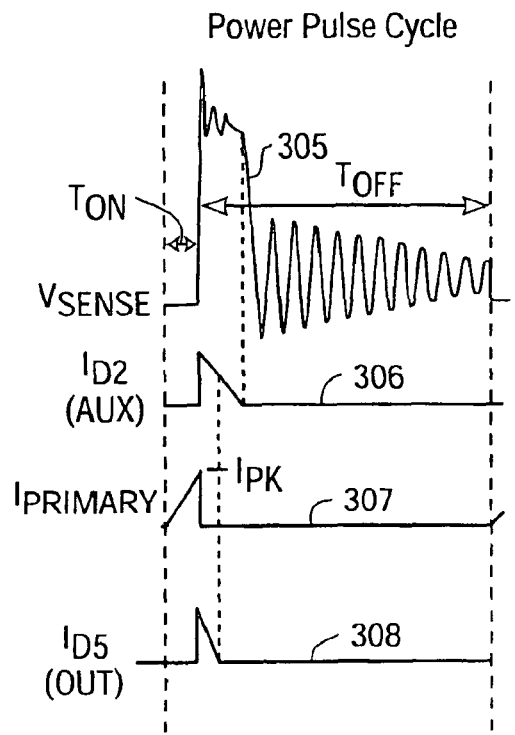

FIGS. 3A and 3B are diagrams showing the waveforms of $V_{SENSE}$ 301, 305, $I_{D2}$ (current through diode $D_2$ in series with the auxiliary winding of the transformer $T_1$) 302, 306, $I_{PRIMARY}$ (current through the primary winding of the transformer $T_1$) 303, 307, and $I_{D5}$ (output current through the diode $D_5$) 304, 308 for one power pulse cycle and one sense pulse cycle, respectively, described in FIG. 1B. As shown in FIGS. 3A and 3B in a corrupt waveform of $V_{SENSE}$, when there is a light load (low current in load), the current IDS 304, 308 (output current through the diode D5 at the secondary winding side of the transformer T1) typically falls to substantially zero before the current $I_{D2}$ 302, 306 through diode $D_2$ in series with the auxiliary winding of the transformer $T_1$ falls to zero. Therefore, it is preferable to measure $V_{SENSE}$ (sampling of $V_{SENSE}$ to control it to be equal to $V_{REG}$) while current is still flowing through the secondary winding of the transformer $T_1$ (before the current IDS falls to substantially zero). In the present invention, a "knee" is defined as the point on the $V_{SENSE}$ waveform when the current $I_{D5}$ (i.e., the current through the secondary winding of the transformer) falls to substantially zero, and the knee voltage $V_{KNEE}$ is the value of $V_{SENSE}$ when the current IDS (i.e., the current through the secondary winding of the transformer) falls to substantially zero. Detecting the "knee" of $V_{SENSE}$ allows the switch controller 100 to sample the value of $V_{SENSE}$ before the current $I_{D5}$ falls to substantially zero by moving the sample point to a timing prior to the "knee" point by a predetermined period (hereinafter "sampling time offset," e.g., 4–6 clocks).

Figure 4:
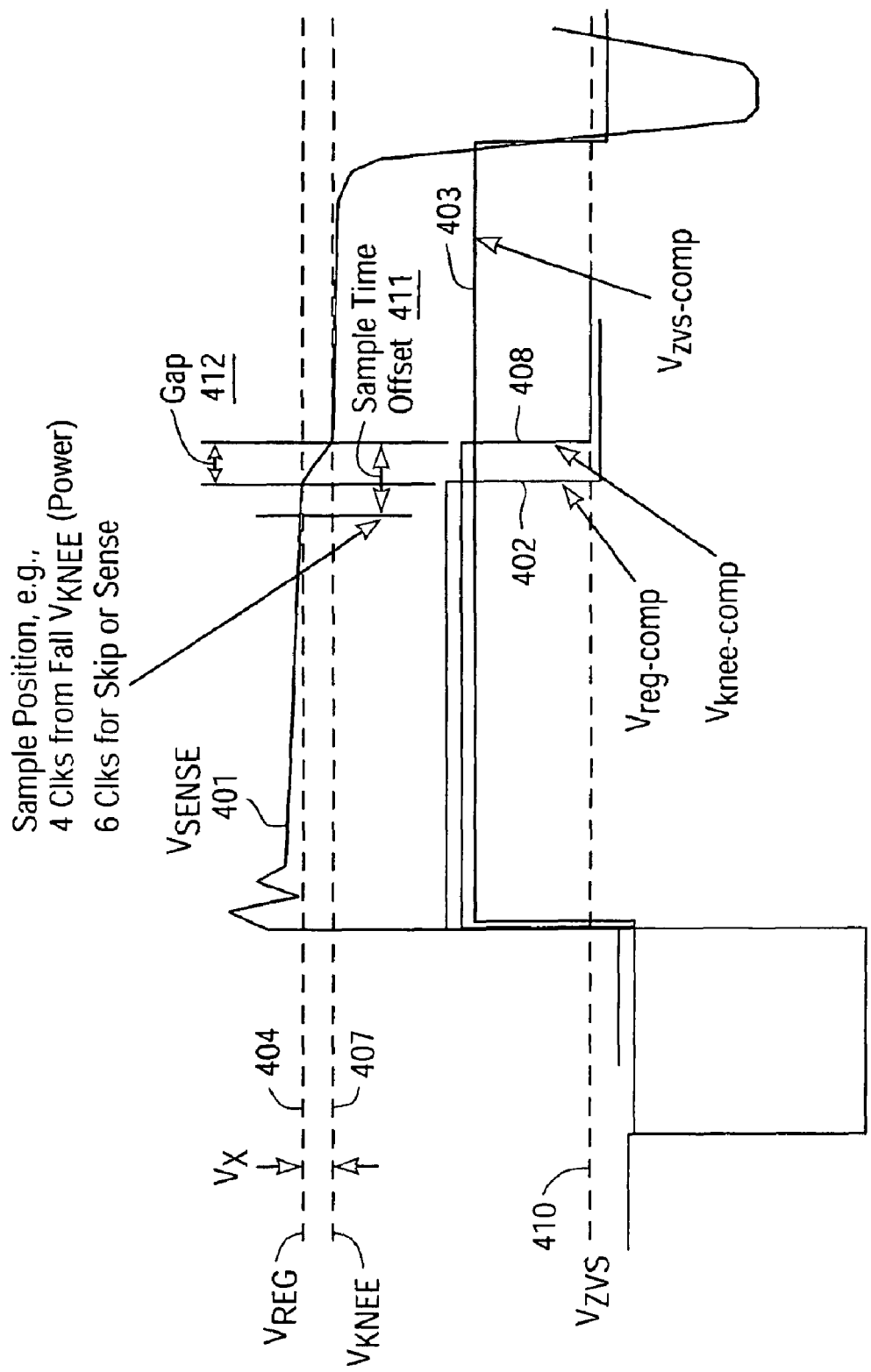
FIG. 4 is a diagram illustrating a sample corrupt waveform of $V_{SENSE}$ when the load is a light load such that a "knee" is present in the waveform.

FIG. 4 is a diagram illustrating a sample corrupt waveform of $V_{SENSE}$ 401 when the load is a light load such that a "knee" is present in the waveform. The knee voltage $V_{KNEE}$ is predetermined to be slightly lower (by a predetermined value Vx) than the reference voltage $V_{REG}$, i.e., $V_{KNEE} = V_{REG} - Vx$, and the sampling of the value of $V_{SENSE}$ occurs prior to the "knee" by the sampling time offset 411.

The value of Vx can be determined by reference to the forward voltage drop versus current characteristics of the diode D5. That is, once the sampling time offset 411 is set (e.g., 4–6 clock periods), the amount of current that would flow through the diode $D_5$ during the sampling time offset 411 can be determined using equations relating to output current in flyback converters, which is well known in the art. As a result, using the diode's forward voltage drop versus current characteristics of the diode $D_5$ (which is unique for any diode and provided in the specification of the diode $D_5$), the forward voltage drop in the diode $D_5$ during the sample time offset 411 can be determined. Vx is set to be at least equal to or larger than such forward voltage drop in the diode $D_5$ during the sample time offset 411, as reflected on the auxiliary winding. The relationship between the forward voltage drop in the diode $D_5$ and the reflected forward voltage drop on the auxiliary winding of the transformer $T_1$ is determined by the winding ratio between the secondary winding and the auxiliary winding of the transformer $T_1$, respectively. In one embodiment, Vx is set to be at least 25 mV.

As shown in FIG. 4, $V_{SENSE}$ 401 is compared to the reference voltage $V_{REG}$ 404 by the feedback comparator 108 to generate the $V_{reg-comp}$ signal 402. $V_{SENSE}$ 401 is also compared to the knee voltage $V_{KNEE}$ 407 by the knee comparator 108 to generate the $V_{knee-comp}$ signal 408. Furthermore, $V_{SENSE}$ 401 is compared to the zero voltage switching reference voltage $V_{ZVS}$ 410 by the Zvs comparator 112 to generate the $V_{zvs-comp}$ signal 403. It is also noted that the $V_{reg-comp}$ signal 402, the $V_{knee-comp}$ signal 408, and the $V_{zvs-comp}$ signal 403 are reset to a low value at the pulse falling edge of the $V_{SENSE}$ train 401 of each switching cycle. As explained previously, in flyback converters using primary side feedback, the sample position is controlled to be prior to when $V_{SENSE}$ equals the knee voltage by a sample time offset 411. In one embodiment, the sample time offset 411 is set as 4 clock cycles for a power pulse and 6 clock cycles for a sense cycle. The event detection module 104 also measures the gap 412 between the points where the $V_{knee-comp}$ signal 408 falls low and where the $V_{reg-comp}$ signal 402 falls low. As will be explained below with reference to FIGS. 5A and 5B, the gap 412 is further used to generate a digital error signal for determining how to control the on-times and off-times of the switch $Q_1$ in the power converter. The gap 412 can be measured by a counter (not shown) in the event detection module 104 measuring the period of time corresponding to the gap 412 in terms of the number of clock cycles.

Figure 5A:
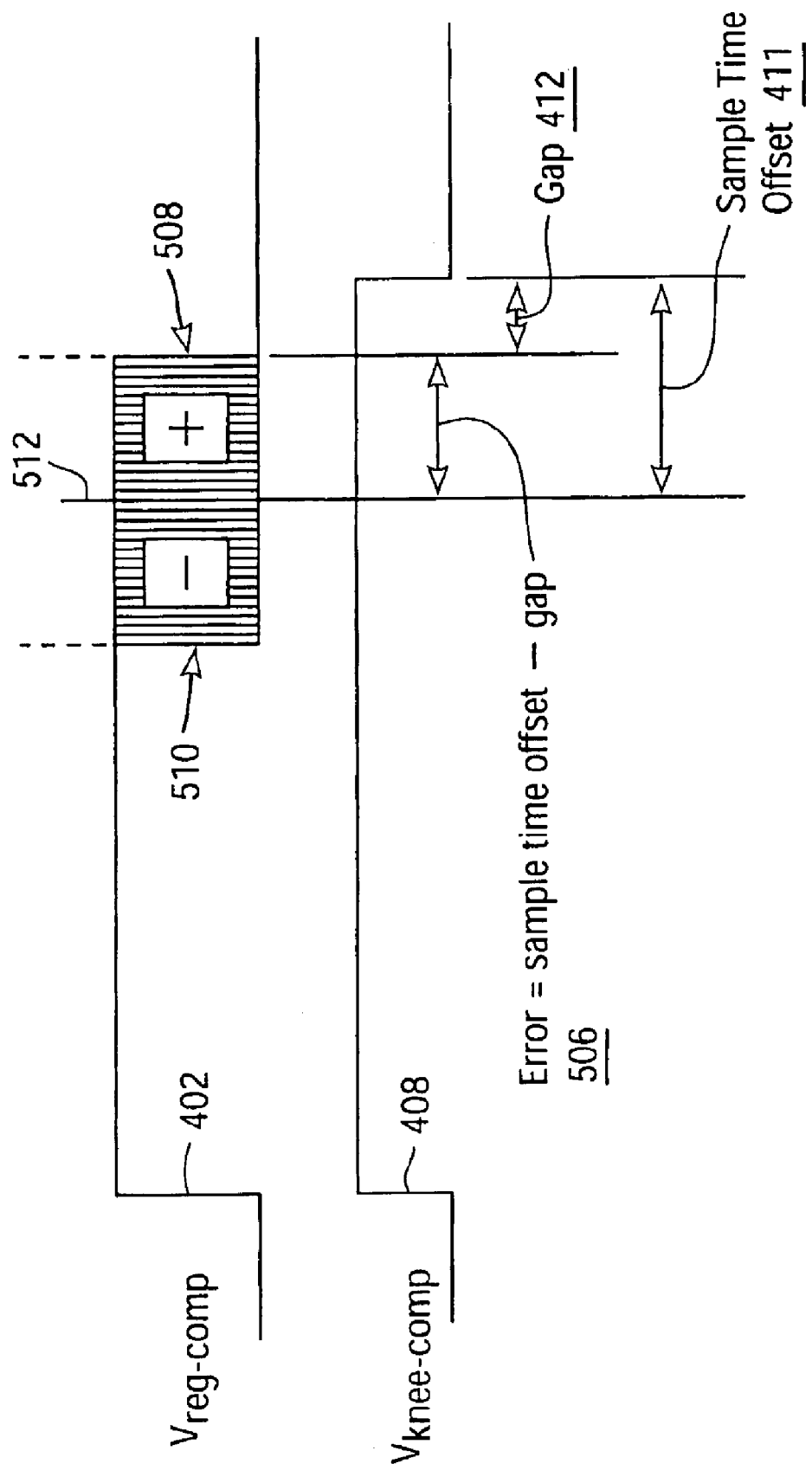
FIG. 5A is a diagram illustrating the generation of a digital error according to one embodiment of the present invention.

FIG. 5A is a diagram illustrating the generation of a digital error according to one embodiment of the present invention. Referring to FIG. 5A, the sample time offset 411 may also be represented in terms of a clock count. A digital error 506 is determined by subtracting the gap 412 from the sample time offset 411. If the digital error 506 is a positive value (e.g., when $V_{reg-comp}$ falls low at point 508), this means the power converter is over-regulated, so in response the power converter is controlled to deliver less power to the load during the subsequent cycle. This is accomplished by the pulse train generator 106 generating shorter on-times of the switch $Q_1$ in response to the digital error 506. If the digital error 506 is a negative value (e.g., when $V_{reg-comp}$ falls low at point 510), this means that the power converter is under-regulated, so in response the power converter is controlled to deliver more power to the load during the subsequent cycle. This is accomplished by the pulse train generator 106 generating longer on-times of the switch $Q_1$ in response to the digital error 506. If the digital error 506 is zero (e.g., when $V_{reg-comp}$ falls low at point 512), this means that the power converter is properly regulated and the power converter will maintain the amount of power delivered to the load during the subsequent cycle. This is accomplished by the pulse train generator 106 maintaining the on-times of the switch $Q_1$. In one embodiment, the digital error 506 is generated in the event detection module 104 and passed on to the pulse train generator 106 via the event bus 105.

According to the present invention, the flyback power converter can monitor the level of the output voltage reflected on the auxiliary winding of the transformer in real time in every cycle of the voltage waveform of the reflected output voltage on the auxiliary winding. No analog-to-digital converter is needed to convert the error between the actual output voltage and the reference voltage to a digital error signal, since the digital error signal is generated from measurements of timings in digital form.

Figure 5B:
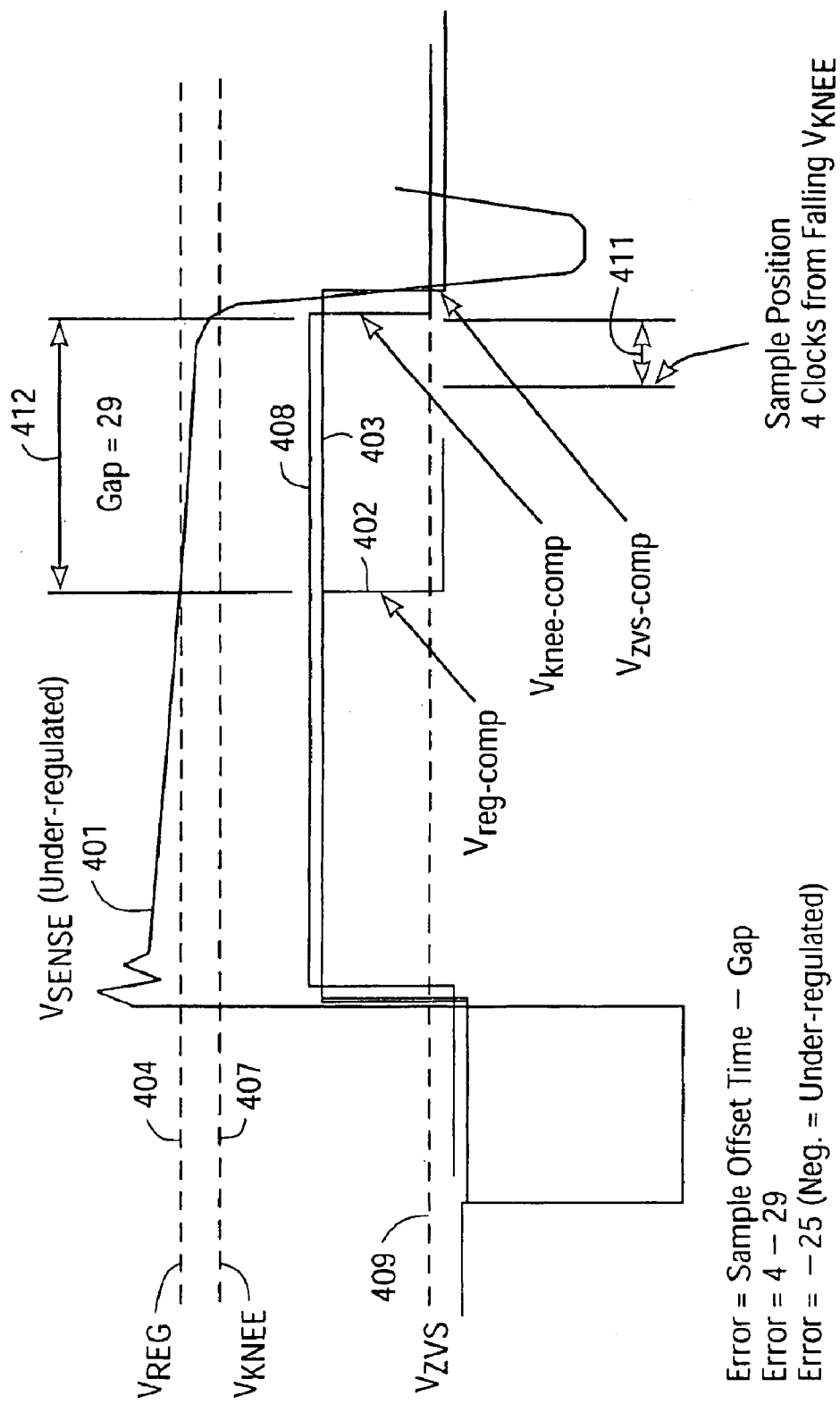
FIG. 5B is a diagram illustrating an example of the waveform of $V_{SENSE}$ when the power converter is under-regulated.

FIG. 5B is a diagram illustrating an example of the waveform of $V_{SENSE}$ when the power converter is under-regulated. Referring to FIG. 5B, the sample offset time 411 is set as 4 clocks prior to $V_{KNEE}$. If the gap 412 is measured to be 29 clock cycles, the digital error is −25 (a negative value), which means that the power converter is under-regulated. In response, the power converter is controlled to deliver more power to the load, for example, by increasing the on-time of the pulses controlling the switch $Q_1$.

Figure 6:
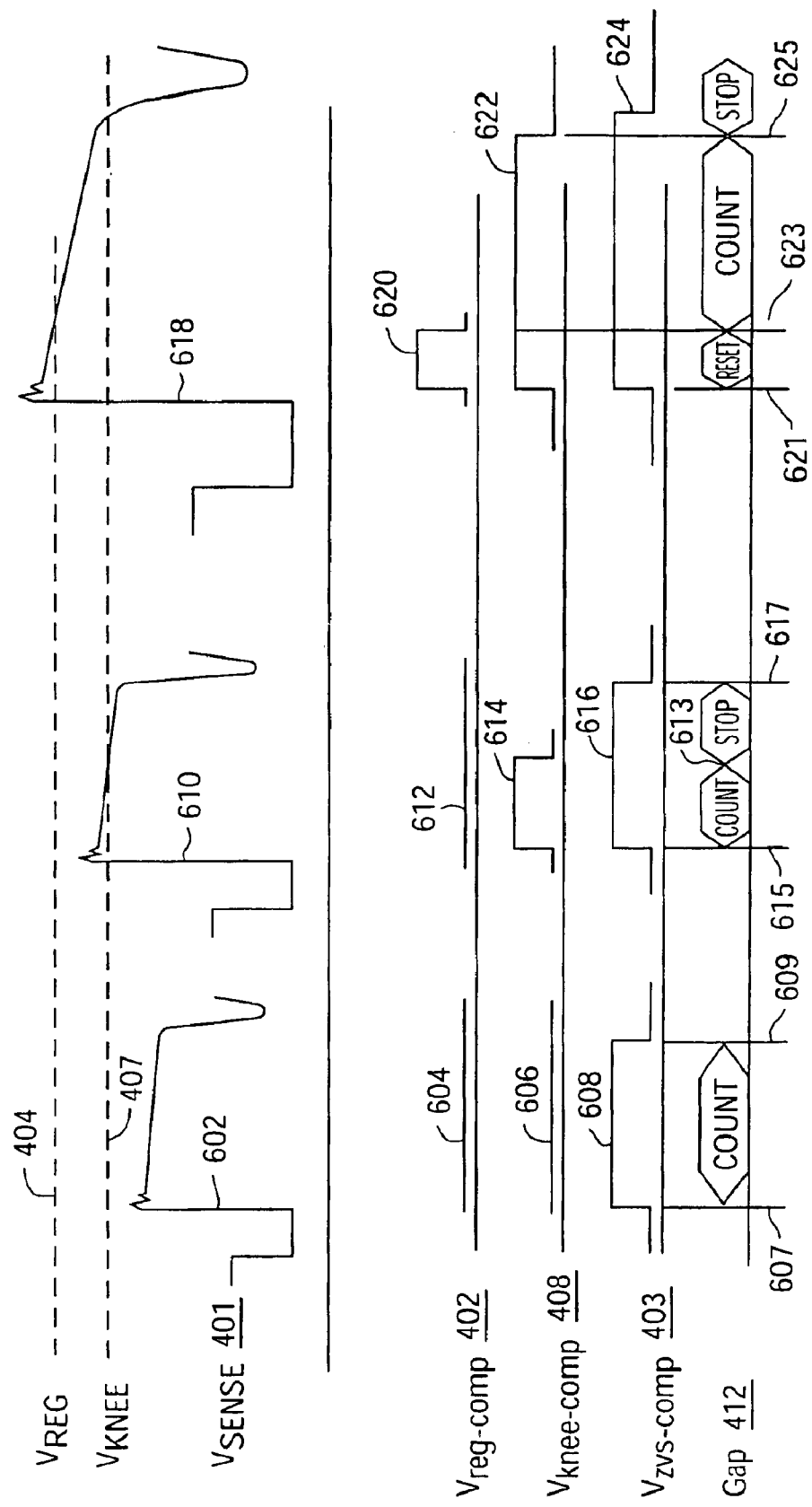
FIG. 6 is a diagram illustrating when to start counting the gap, stop counting the gap, or reset the value of the gap, according to one embodiment of the present invention.

FIG. 6 is a diagram illustrating when to start counting the gap 412, stop counting the gap 412, or reset the value of gap 412, according to one embodiment of the present invention. FIG. 6 shows three different situations 602, 610, 618 where the $V_{SENSE}$ 401 is under-regulated 602, just starting to be regulated 610, and normally regulated 618.

Referring to FIG. 6, when the power converter is significantly under-regulated 602, $V_{reg-comp}$ 402 and $V_{knee-comp}$ 408 do not become high but remain flat as shown with signals 604 and 606, respectively, and only $V_{zvs-comp}$ 403 becomes high during the off-time of the switch $Q_1$ as shown with signal 608. This is because $V_{SENSE}$ 401 never becomes higher than $V_{REG}$ 404 or $V_{KNEE}$ 407. In this case, as an exception to the general rule that the gap is the time difference between the falling edges of $V_{reg-comp}$ 402 and $V_{knee-comp}$ 408, the gap 412 is counted for the entire period during which the $V_{zvs-comp}$ signal 403 is high (between points 607 and 609), so that the power converter starts delivering more power to the load.

When the power converter just starts to be regulated 610, $V_{reg-comp}$ 402 never becomes high but remains flat as shown with signals 612, and only $V_{knee-comp}$ 408 and $V_{zvs-comp}$ 403 become high for certain periods of time during the off-time of the switch $Q_1$ as shown with signals 614 and 616, respectively. This is because $V_{SENSE}$ 401 never becomes higher than $V_{REG}$ 404. In this case, as an exception to the general rule that the gap is the time difference between the falling edges of $V_{reg-comp}$ 402 and $V_{knee-comp}$ 403, the gap 412 is counted for the entire period during which the $V_{knee-comp}$ signal 408 is high (between points 615 and 613) but is not counted after the $V_{knee-comp}$ signal 408 falls low, so that the power converter starts delivering more power to the load. The gap signal 412 is not reset in this situation.

When the power converter is normally regulated 618, all of $V_{reg-comp}$ 402, $V_{knee-comp}$ 408, and $V_{zvs-comp}$ 403 become high for certain periods of time during the off-time of the switch $Q_1$ as shown with signals 620, 622, and 624, respectively. In this case, the gap 412 is counted according to the general rule that the gap is the time difference between the falling edges of $V_{reg-comp}$ 402 and $V_{knee-comp}$ 408 (between the points 623 and 625), but is not counted after the $V_{knee-comp}$ signal 408 falls low (after point 625). The gap signal 412 is also reset while the $V_{reg-comp}$ 620 is high (between points 621 and 623).

Figure 7:
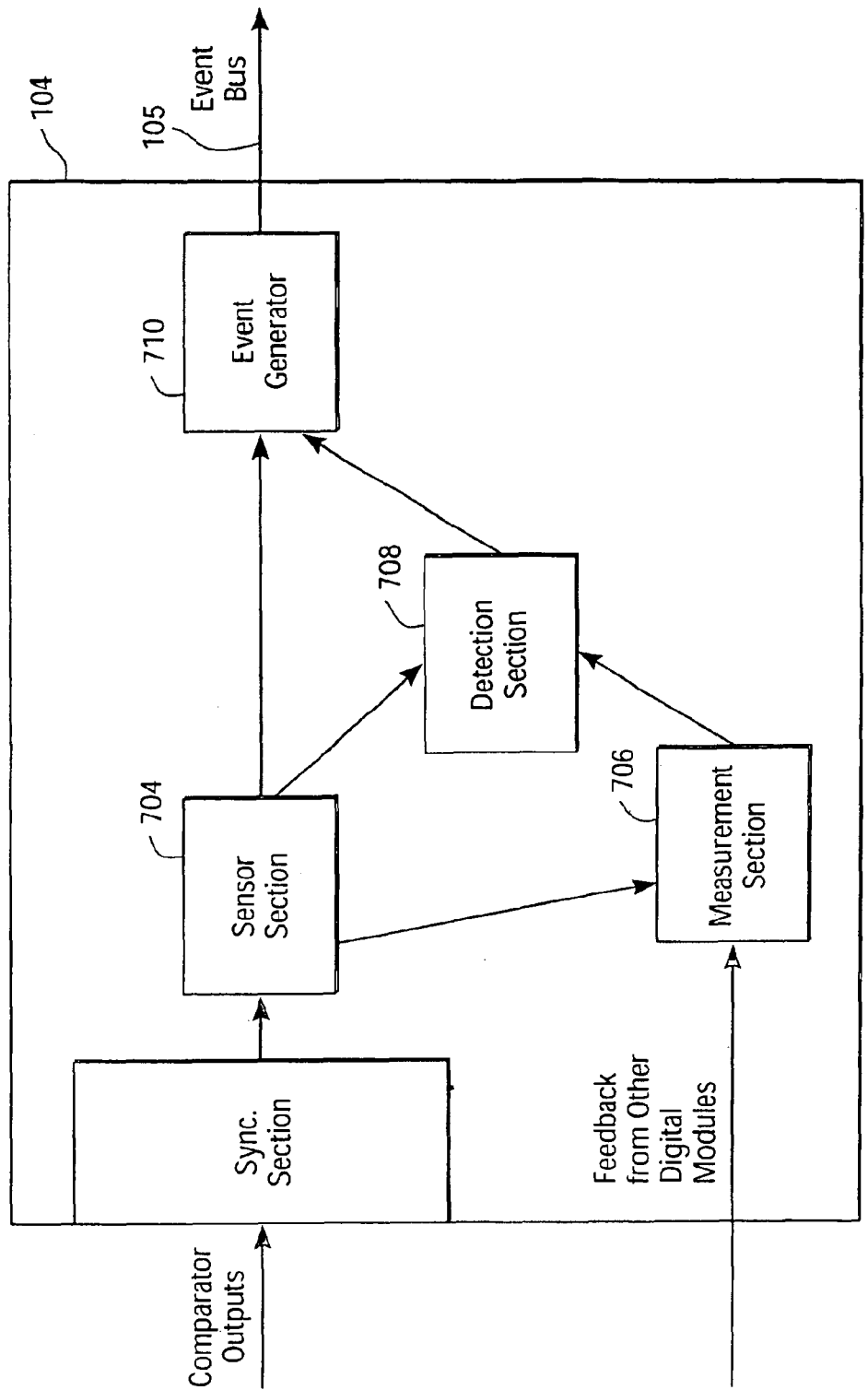
FIG. 7 is a block diagram illustrating the event detection module, according to one embodiment of the present invention.

FIG. 7 is a block diagram illustrating the event detection module 104, according to one embodiment of the present invention. The event detection module 104 includes a synchronization section 702, a sensor section 704, a measurement section 706, a detection section 708, and an event generator 710.

The synchronization section 702 receives the comparator outputs such as $V_{reg-comp}$ comp 402, $V_{knee-comp}$ 408, and $V_{zvs-comp}$ 403, and synchronizes them to the system clock of the power converter. The sensor section 704 senses the levels and edges of the various signals of the power converter, such as $V_{reg-comp}$ 402, $V_{knee-comp}$ 408, and $V_{zvs-comp}$ 403 and passes on such sensed information to the detection section 708 and the measurement section 706. The measurement section 706 includes counters (not shown) for counting various timings such as those (e.g., gap) needed for generating the digital error signal and passes on such counts to the detection section 708. The detection section 708 determines the type of event that occurred, including determination of the digital error, based on the sensed information received from the sensor section 704 and the counts of various timings received from the measurement section 706, and passes on such determination of events to the event generator 710. The event generator 710 receives the determination of events from the detection section 708, generates event signals (e.g., setting a particular flag corresponding to the event high) indicating the event, and passes on the event signals to the pulse train generator 106 via the event bus 105. The event generator resets the event signals at every switching cycle of the power converter.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A power converter comprising:
   a switch that electrically couples or decouples a load to or from a power source; and
   a switch controller coupled to the switch for controlling on-times and off-times of the switch, the switch controller including:
   an event detection module for generating a digital error signal, the digital error signal being generated at a switching frequency of the switch and indicating a voltage delivered to the load in a first switching cycle of the switch in relation to a reference voltage to be delivered to the load; and
   a pulse generator coupled to the event detection module for generating a pulse signal that determines the on-time and off-time of the switch for a second switching cycle subsequent to the first switching cycle based upon the digital error signal.

2. The power converter of claim 1, wherein the power converter is a primary side sensing flyback power converter and includes a transformer coupled between the switch and the load and having a primary winding coupled to the switch, a secondary winding coupled to the load, and an auxiliary winding coupled to the switch controller, the switch controller determining:
   a knee voltage timing, the knee voltage timing indicating the timing when a sensed voltage at the auxiliary winding equals a knee voltage at which a current through the secondary winding of the transformer falls to substantially zero; and
   a reference voltage timing, the reference voltage timing indicating the timing when the sensed voltage at the auxiliary winding equals the reference voltage.

3. The power converter of claim 2, wherein the event detection module:
   determines a gap quantifying a difference between the knee voltage timing and the reference voltage timing; and
   subtracts the gap from a predetermined sample time offset to generate the digital error signal, the sample time offset corresponding to a predetermined time difference between a sampling timing of the sensed voltage and the knee voltage timing.

4. The power converter of claim 3, wherein the knee voltage is lower than the reference voltage by a forward voltage drop of a diode coupled between the secondary winding and the load as reflected on the auxiliary winding, the forward voltage drop corresponding to an amount of current that flows through the diode during the sampling time offset.

5. The power converter of claim 3, wherein the pulse generator generates the pulse signal to decrease the on-time of the switch in the second switching cycle when the digital error signal has a positive value and to increase the on-time of the switch in the second switching cycle when the digital error signal has a negative value.

6. The power converter of claim 3, wherein the pulse generates the pulse signal to maintain the on-time of the switch in the second switching cycle to be same as the on-time of the switch in the first switching cycle when the digital error signal has a value of zero.

7. The power converter of claim 3, wherein the switch controller further includes:
   a knee voltage comparator comparing the sensed voltage to the knee voltage to generate a knee voltage comparator signal that is high when the sensed voltage is higher than the knee voltage and low when the sensed voltage is lower than the knee voltage, the event detection module determining the knee voltage timing by determining a transition timing of the knee voltage comparator signal from high to low; and
   a reference voltage comparator comparing the sensed voltage to the reference voltage to generate a reference voltage comparator signal that is high when the sensed voltage is higher than the reference voltage and low when the sensed voltage is lower than the reference voltage, the event detection module determining the reference voltage timing by determining a transition timing of the reference voltage comparator signal from high to low.

8. The power converter of claim 7, wherein the switch controller further includes a zero voltage comparator comparing the sensed voltage to a zero voltage reference voltage to generate a zero voltage comparator signal that is high when the sensed voltage is higher than the zero voltage reference voltage and low when the sensed voltage is lower than the zero voltage reference voltage, and the event detection module determines the gap by determining a period of time while the knee voltage comparator and the zero voltage comparator signal are high but the reference voltage comparator signal is low.

9. The power converter of claim 2, wherein the event detection module further detects at the switching frequency at least one selected from the group consisting of the sensed voltage falling lower than the reference voltage, the sensed voltage falling lower than the knee voltage, the sensed voltage falling lower than a zero voltage reference voltage, the sensed voltage rising higher than the zero voltage reference voltage, a rising edge of the pulse signal, a falling edge of the pulse signal, system resonance, and transformer reset time.

10. A switch controller for controlling on-times and off-times of a switch that electrically couples or decouples a load to or from a power source in a power converter, the switch controller comprising:
    an event detection module for generating a digital error signal, the digital error signal being generated at a switching frequency of the switch and indicating a voltage delivered to the load in a first switching cycle of the switch in relation to a reference voltage to be delivered to the load; and a pulse generator coupled to the event detection module for generating a pulse signal that determines the on-time and off-time of the switch for a second switching cycle subsequent to the first switching cycle based upon the digital error signal.

11. The switch controller of claim 10, wherein the power converter is a primary side sensing flyback power converter and includes a transformer coupled between the switch and the load and having a primary winding coupled to the switch, a secondary winding coupled to the load, and an auxiliary winding coupled to the switch controller, the switch controller determining:

a knee voltage timing, the knee voltage timing indicating the timing when a sensed voltage of the auxiliary winding equals a knee voltage at which a current through the secondary winding of the transformer falls to substantially zero; and a reference voltage timing, the reference voltage timing indicating the timing when the sensed voltage of the auxiliary winding equals the reference voltage.

12. The switch controller of claim 11, wherein the event detection module:

determines a gap quantifying a difference between the knee voltage timing and the reference voltage timing; and subtracts the gap from a predetermined sample time offset to generate the digital error signal, the sample time offset corresponding to a predetermined time difference between a sampling timing of the sensed voltage and the knee voltage timing.

13. The switch controller of claim 12, wherein the knee voltage is lower than the reference voltage by a forward voltage drop of a diode coupled between the secondary winding and the load as reflected on the auxiliary winding, the forward voltage drop corresponding to an amount of current that flows through the diode during the sampling time offset.

14. The switch controller of claim 12, wherein the pulse generator generates the pulse signal to decrease the on-time of the switch in the second switching cycle when the digital error signal has a positive value and to increase the on-time of the switch in the second switching cycle when the digital error signal has a negative value.

15. The switch controller of claim 12, wherein the pulse generates the pulse signal to maintain the on-time of the switch in the second switching cycle to be same as the on-time of the switch in the first switching cycle when the digital error signal has a value of zero.

16. The switch controller of claim 12, further comprising:

a knee voltage comparator comparing the sensed voltage to the knee voltage to generate a knee voltage comparator signal that is high when the sensed voltage is higher than the knee voltage and low when the sensed voltage is lower than the knee voltage, the event detection module determining the knee voltage timing by determining a transition timing of the knee voltage comparator signal from high to low; and a reference voltage comparator comparing the sensed voltage to the reference voltage to generate a reference voltage comparator signal that is high when the sensed voltage is higher than the reference voltage and low when the sensed voltage is lower than the reference voltage, the event detection module determining the reference voltage timing by determining a transition timing of the reference voltage comparator signal from high to low.

17. The switch controller of claim 16, further comprising a zero voltage comparator comparing the sensed voltage to a zero voltage reference voltage to generate a zero voltage comparator signal that is high when the sensed voltage is higher than the zero voltage reference voltage and low when the sensed voltage is lower than the zero voltage reference voltage, the event detection module determining the gap by determining a period of time while the knee voltage comparator and the zero voltage comparator signal are high but the reference voltage comparator signal is low.

18. The switch controller of claim 11, wherein the event detection module further detects at the switching frequency at least one selected from the group consisting of the sensed voltage falling lower than the reference voltage, the sensed voltage falling lower than the knee voltage, the sensed voltage falling lower than a zero voltage reference voltage, the sensed voltage rising higher than the zero voltage reference voltage, a rising edge of the pulse signal, a falling edge of the pulse signal, system resonance, and transformer reset time.

19. A method for controlling on-times and off-times of a switch that electrically couples or decouples a load to or from a power source in a power converter, the method comprising:

generating a digital error signal at a switching frequency of the switch, the digital error signal indicating a voltage delivered to the load in a first switching cycle of the switch in relation to a reference voltage to be delivered to the load; and generating a pulse signal that determines the on-time and off-time of the switch for a second switching cycle subsequent to the first switching cycle based upon the digital error signal.

20. The method of claim 19, wherein the power converter is a primary side sensing flyback power converter and includes a transformer coupled between the switch and the load and having a primary winding coupled to the switch, a secondary winding coupled to the load, and an auxiliary winding coupled to the switch controller, the step of generating a digital error signal including:

determining a knee voltage timing, the knee voltage timing indicating the timing when a sensed voltage of the auxiliary winding equals a knee voltage at which a current through the secondary winding falls to substantially zero; and determining a reference voltage timing, the reference voltage timing indicating the timing when the sensed voltage of the auxiliary winding equals the reference voltage.

21. The method of claim 20, wherein the step of generating a digital error signal further includes:

determining a gap quantifying a difference between the knee voltage timing and the reference voltage timing; and subtracting the gap from a predetermined sample time offset to generate the digital error signal, the sample time offset corresponding to a predetermined time difference between a sampling timing of the sensed voltage and the knee voltage timing.

22. The method of claim 21, wherein the knee voltage is lower than the reference voltage by a forward voltage drop of a diode coupled between the secondary winding and the load as reflected on the auxiliary winding, the forward voltage drop corresponding to an amount of current that flows through the diode during the sampling time offset.

23. The method of claim 21, wherein the step of generating the pulse signal includes:

determining the sign of the digital error signal;

responsive to determining that the digital error signal has a positive value, decreasing the on-time of the switch in the second switching cycle;

responsive to determining that the digital error signal has a negative value, increasing the on-time of the switch in the second switching cycle.

24. The method of claim 21, wherein the step of generating the pulse signal includes:

determining the sign of the digital error signal;

responsive to determining that the digital error signal has a value of zero, maintaining the on-time of the switch in the second switching cycle to be same as the on-time of the switch in the first switching cycle.

25. The method of claim 21, wherein:

the step of determining the knee voltage timing includes:

comparing the sensed voltage to the knee voltage to generate a knee voltage comparator signal that is high when the sensed voltage is higher than the knee voltage and low when the sensed voltage is lower than the knee voltage; and determining the knee voltage timing by determining a transition timing of the knee voltage comparator signal from high to low; and the step of determining the reference voltage timing includes:

comparing the sensed voltage to the reference voltage to generate a reference voltage comparator signal that is high when the sensed voltage is higher than the reference voltage and low when the sensed voltage is lower than the reference voltage; and determining the reference voltage timing by determining a transition timing of the reference voltage comparator signal from high to low.

26. The method of claim 25, wherein:

the step of generating a digital error signal further includes determining a zero voltage timing by comparing the sensed voltage to a zero voltage reference voltage to generate a zero voltage comparator signal that is high when the sensed voltage is higher than the zero voltage reference voltage and low when the sensed voltage is lower than the zero voltage reference voltage, and the step of determining the gap includes determining a period of time while the knee voltage comparator and the zero voltage comparator signal are high but the reference voltage comparator signal is low.

27. A power converter comprising:

switching means that electrically couples or decouples a load to or from a power source; and switch controller means coupled to the switching means for controlling on-times and off-times of the switching means, the switch controller means including:

means for generating a digital error signal, the digital error signal being generated at a switching frequency of the switching means and indicating a voltage delivered to the load in a first switching cycle of the switching means in relation to a reference voltage to be delivered to the load; and means for generating a pulse signal that determines the on-time and off-time of the switching means for a second switching cycle subsequent to the first switching cycle based upon the digital error signal.

28. The power converter of claim 27, wherein the power converter is a primary side sensing flyback power converter and includes a transformer coupled between the switching means and the load and having a primary winding coupled to the switching means, a secondary winding coupled to the load, and an auxiliary winding coupled to the switch controller means, the switch controller means determining:

a knee voltage timing, the knee voltage timing indicating the timing when a sensed voltage of the auxiliary winding equals a knee voltage at which a current through the secondary winding falls to substantially zero; and a reference voltage timing, the reference voltage timing indicating the timing when the sensed voltage of the auxiliary winding equals the reference voltage.

29. The power converter of claim 28, wherein the means for generating a digital error signal includes:

means for determining a gap quantifying a difference between the knee voltage timing and the reference voltage timing; and means for subtracting the gap from a predetermined sample time offset, the sample time offset corresponding to a predetermined time difference between a sampling timing of the sensed voltage and the knee voltage timing.

30. A switch controller for controlling on-times and off-times of a switch that electrically couples or decouples a load to or from a power source in a power converter, the switch controller comprising:

means for generating a digital error signal, the digital error signal being generated at a switching frequency of the switch and indicating a voltage delivered to the load in a first switching cycle of the switch in relation to a reference voltage to be delivered to the load; and means for generating a pulse signal that determines the on-time and off-time of the switch for a second switching cycle subsequent to the first switching cycle based upon the digital error signal.

31. The switch controller of claim 30, wherein the power converter is a primary side sensing flyback power converter and includes a transformer coupled between the switch and the load and having a primary winding coupled to the switch, a secondary winding coupled to the load, and an auxiliary winding coupled to the switch controller, the switch controller determining:

a knee voltage timing, the knee voltage timing indicating the timing when a sensed voltage of the auxiliary winding equals a knee voltage at which a current through the secondary winding falls to substantially zero; and a reference voltage timing, the reference voltage timing indicating the timing when the sensed voltage of the auxiliary winding equals the reference voltage.

32. The switch controller of claim 31, wherein the means for generating a digital error signal includes:

means for determining a gap quantifying a difference between the knee voltage timing and the reference voltage timing; and means for subtracting the gap from a predetermined sample time offset, the sample time offset corresponding to a predetermined time difference between a sampling timing of the sensed voltage and the knee voltage timing.

* * * * *